United States Patent
Drimer

(10) Patent No.: US 7,502,815 B1
(45) Date of Patent: Mar. 10, 2009

(54) TRUE RANDOM NUMBER GENERATOR AND METHOD OF GENERATING TRUE RANDOM NUMBERS

(75) Inventor: Saar Drimer, Campbell, CA (US)

(73) Assignee: XILINX, Inc., San Jose, CA (US)

( * ) Notice: Subject to any disclaimer, the term of this patent is extended or adjusted under 35 U.S.C. 154(b) by 685 days.

(21) Appl. No.: 10/783,762

(22) Filed: Feb. 20, 2004

(51) Int. Cl.
*G06F 7/58* (2006.01)
*G06F 1/02* (2006.01)

(52) U.S. Cl. ............... 708/255; 708/250; 375/226; 713/503

(58) Field of Classification Search ............ 375/219, 375/226, 371–373; 370/516; 702/69; 708/250, 708/251, 253, 255, 256, 272, 273; 713/502, 713/503
See application file for complete search history.

(56) References Cited

U.S. PATENT DOCUMENTS

| | | | | |
|---|---|---|---|---|
| 4,890,248 | A * | 12/1989 | Reinhardt | 702/191 |
| 5,633,816 | A * | 5/1997 | Wallace | 708/252 |
| 5,732,138 | A | 3/1998 | Noll et al. | |
| 6,480,072 | B1 * | 11/2002 | Walsh et al. | 331/78 |
| 7,020,791 | B1 * | 3/2006 | Aweya et al. | 713/400 |
| 7,218,670 | B1 * | 5/2007 | Lesea et al. | 375/226 |
| 2005/0193045 | A1 * | 9/2005 | Yamamoto et al. | 708/250 |

OTHER PUBLICATIONS

U.S. Appl. No. 10/717,047, filed Nov. 18, 2003, Lesea et al.
"Jitter Test Patterns"; IEEE Draft P802.3ae/D2.01, Annex 48A, Jan. 15, 2001, pp. 1-3, Available from IEEE web address http://grouper.ieee.org/groups/802/3/ae/public/jan01/taborek_2_0101.pdf or IEEE, 3 Park Avenue, 17th Floor, New York, NY 10016-5997.
McNichol Tom; "Totally Random," Issue 11.08m Aug. 2003, available from Wired Digital Inc., at http://www.wired.com/wired/archive/11.08/random_pr.html.
Rukhin, A., et al., "NIST Special Publication 800.22: A Statistical Test Suite for the Validation of Random Number Generators and Pseudo Generators for Cryptographic Applications," NIST, May 15, 2001, pp. 1-153, Errata Sheet, 3 pages.

* cited by examiner

*Primary Examiner*—Young T. Tse
(74) *Attorney, Agent, or Firm*—Walter D. Fields; Justin Liiu

(57) ABSTRACT

A true random number generator may comprise a multi-gigabit transceiver with a transceiver to receive a signal of predetermined source data. Recovery circuitry of the transceiver may be operable to recover data from the received signal. A controller may stress the recovery circuit to cause a portion of the data recovered to differ from the respective portion of the predetermined source data. An extractor may define numbers for a true random number sequence based on differences between the recovered data and the predetermined serial source data over an interval of time. In a particular example, the controller may influence at least one of the serial data transfer rate, the number of sequential same-state bits for the predetermined source data, and the stability of a clock signal to be recovered by a portion of the recovery circuit.

33 Claims, 6 Drawing Sheets

TRUE RANDOM NUMBER GENERATOR AND METHOD OF GENERATING TRUE RANDOM NUMBERS

FIELD OF THE INVENTION

The present disclosure relates to random number generators and methods of generating random numbers; and more particularly to methods of generating random numbers using a multi-gigabit transceiver (MGT).

BACKGROUND

Random numbers can be found in a variety of applications within the engineering, technology, communication and computing science fields. Typically, the random number generators of hardware and/or software realization may comprise a pseudo-random generating embodiment that may use a seed basis for generating the sequence. But these seed based pseudo-random number generators can often result in an increased risk of predictability, wherein knowledge of an algorithm may offer an understanding of previous and future generated numbers. Although pseudo-random number generation may be suitable for certain applications such as for testing, because of its potential predictability, the pseudo-random generation may be inappropriate for other applications such as cryptography.

For secure cryptography applications, it may be essential that the security system implement a method for generating a random number that is completely random. For such true random number generator systems, a completely random password or cryptographic key may offer no prior knowledge that can be exploited or infiltrated by an adversary or malicious intruder. Ideally, a true random number generator may generate a sequence of numbers that is unpredictable, irreproducible and non-repeating. Traditional true random number generators have generally used means such as radiation decay, thermal noise or oscillator imperfections for purpose of generating numbers of a random distribution.

These types of systems have typically used a form of chaotic system, one in which its state may change over time in a largely unpredictable manner. Generally, some sensing means may sense and convert the state of a system into a sequence of, bits of, for example, a binary number. Previous chaotic systems have included sources such as the sound of radio static, the output of a noisy diode, or radiation decay.

A sensor can sense the noise event of the source and convert it into a digital signal. A pseudo-random binary string can be generated from the digital recording of static noise via a digital microphone. A noisy diode can be sampled at a suitable frequency and converted into a digital signal. A Geiger counter may sense the random decay of a radioactive source to establish data for a binary string.

It may be noted, however, that problems may result from the use of a chaotic system that is not completely random. For example, there may exist certain inherent localities within the system that may present a region of predictability. Such flaws may make these systems undesirable, at least for the basis of establishing secure cryptographic systems with unpredictable keys or encrypted bit streams.

Another disadvantage of some chaotic systems as a source of randomness relates to their efficiency in generating a digital signal and numbers therefrom. Such efficiency limitation may be overcome by use of pseudo-random number generators, which may deterministically generate a sequence of numbers by some computational process from an initial number called a seed. Such computational process may generate a sequence of numbers from the seed that may appear to be random. In other words, an outside observer cannot predict the next number to be generated from the list of numbers previously generated without expending a great deal of computational effort. Thus, to generate a long sequence of pseudo-random numbers, one need only generate a single true random number, which may be used as the seed for the pseudo-random number generator.

Despite its predictability, pseudo-random number generation can find some favor given that it may afford simple realizations. In contrast, customary embodiments for true random number generators are typically more cumbersome and perhaps incapable of realization in a self-contained device such as a within a field programmable gate array. Some have described the possibility of a "high-output generator that can plumb mere disorder and extract true randomness—a task, incidentally, beyond the reach of any computer on earth". See Tom McNichol, "Totally Random: How two math geeks with a lava lamp and a webcam are about to unleash chaos on the Internet," Wired, issue 11.08 (August 2003). But if a true random number generator were capable of simplified integration and/or capable of realization within a self-contained solution, then the true random number generator might be more widely accepted within a greater variety of system and/or process applications to offer devices of greater functionality, smaller size and higher security.

Concerning such features of device size and functionality, the semiconductor industry continually pushes for devices of greater density and smaller geometries. At the same time, the demand for increased data handling capability in combination with the desire for greater levels of integration has increased the premium for signal interfacing to a semiconductor device. Because of the reductions in I/O real estate, circuit realizations that may offer ability for self-containment within a semiconductor device can soften the I/O compromise that would otherwise result from size reductions.

Easing some of the effects of reduced I/O real estate, some manufacturers of high-speed data communication devices have developed transceivers with parallel-to-serial and serial-to-parallel data multiplexing/de-multiplexing circuit designs. By using these multiplexing circuits, the high-pin count, parallel data interfaces may be replaced with lower pin count, high-speed serial data interfaces. On a receiver side of a transceiver, for example, a high-speed serial data sequence may be received from an I/O link and then converted into parallel data of a slower clock rate. Conversely, on the transmission side of the transceiver, parallel data of a low-clock rate may be converted from the parallel format into a higher-speed, serial format.

Thus, transceivers with parallel-to-serial and serial-to-parallel multiplexing/de-multiplexing circuits may be integrated into data communication devices to enhance their data handling capability. As a result, such transceivers have found their way into various high-density, integrated circuits. Such circuits may include data communication devices, data processors, network modules, switchers, relays, gateways, modems, and in particular highly integrated programmable circuits, e.g., a programmable logic device (PLD) such as a Field Programmable Gate Array (FPGA).

To assist resolution of data from a serial data input signal, a clock recovery circuit of the transceiver may determine transitions of the input data signal and control a frequency/phase of a recovered internal clock in accordance with the relative frequency/phase placements of the received data signal. It may be understood, however, that in order to keep the frequency/phase of the internally recovered clock in synchronous relationship to that associated with the incoming data signal, the data signal received may need to employ an encoding/decoding protocol that can assure a sufficient number of transitions over a given interval or duration for enabling appropriate closed-loop control via the transitions of the serial data signal.

Some of these encoding/decoding protocols (e.g., Ethernet, Sonet, InfiniBand, Fibre Channel, etc.) may be described as a form of "non-return to zero" encoding. In a particular example, an 8-bit/10-bit (non-return to zero) protocol may encode data to assure that only a limited number (5 bits) of same-state data bits may occur consecutively within the data stream. In other words, it may assure that, e.g., only five data bits of same state (one or zero) may occur consecutively within the serial data stream. Else, absent a sufficient frequency of state transitions within the serial data signal, the clock generator of a clock recovery circuit might begin to drift or wander relative to the frequency/phase inherent within the input data signal.

Further, it may be understood that the reliability of the data recovery may depend upon the amount of drift/wandering, or "jitter," attributable to transceivers and associated clock recovery circuits. In other words, the amount of wandering or drift that may be inherent within the transceiver may impact its jitter tolerance, which in turn may hinder its reliability with higher speed data transfers. The lower the performance or jitter tolerance, the lower its reliability and capability for high-speed serial data transfer.

SUMMARY

In accordance with an embodiment of the present invention, the random error characteristics of a serial data transceiver, such as a multi-gigabit transceiver in a programmable logic device, may serve as the basis for generating true random numbers. The true random numbers might then be used as seeds to a pseudo-random number generator. Errors from the MGT may be counted and bits of the counter, such as the lower bits, may drive synthesis for generation of the true random numbers.

In further embodiments, a controller may stress the operability of the transceiver to influence an error rate for a greater probability of errors. In some cases, the receiver of the transceiver may be exercised beyond its tolerance capabilities and force to operate in a higher failure mode and to produce random erroneous bit errors from the sampling of the input data. The stress may comprise, for example, affecting the pattern of the source data supplied to the receiver, increasing the delay between the output of the source data and the receipt by the receiver, attenuating the level of the serial input signal to the receiver, and/or lowering the stability of reference clock that may have been recovered by the receiver.

In further embodiments, influence of the error probability may be adjusted dynamically so as to enable real-time control (internally or externally) over the random number characteristics for the sequence synthesis.

In a particular embodiment, a receiver of a serial data transceiver within a programmable logic device may receive a serial data signal, which may have been output with predetermined source data. A circuit of the programmable logic device may link the output of the receiver and data recovery circuit to a comparator. The comparator may compare data recovered by the receiver to reference data to determine any errors. These errors may be counted and the count values used as the basis for generating a random number. In some embodiments, the random number may be based on the number of errors counted at a given time, the time from startup to first error or the difference in time between consecutive errors. In further embodiments, the receiver may be stressed during at least a portion of the recovery of data from the received serial data signal.

BRIEF DESCRIPTION OF THE DRAWINGS

Embodiments and features of the present invention will become more apparent from the detailed description and the appended claims, with reference to the accompanying drawings, in which:

DETAILED DESCRIPTION

In the following description, numerous specific details may be set forth to provide an understanding of exemplary embodiments of the present invention. It will be understood, however, that alternative embodiments may comprise subcombinations of the disclosed examples.

Additionally, readily established circuits and procedures of the exemplary embodiments may be disclosed in simplified form (e.g., simplified block diagrams and/or simplified description) to avoid obscuring an understanding of the embodiments with excess detail. Likewise, to aid a clear and precise disclosure, description of known processes—e.g., triggering, clocking, state-machine, programming procedures—may similarly be simplified where persons of ordinary skill in this art can readily understand their structure and operations by way of the drawings and disclosure.

Figure 1:
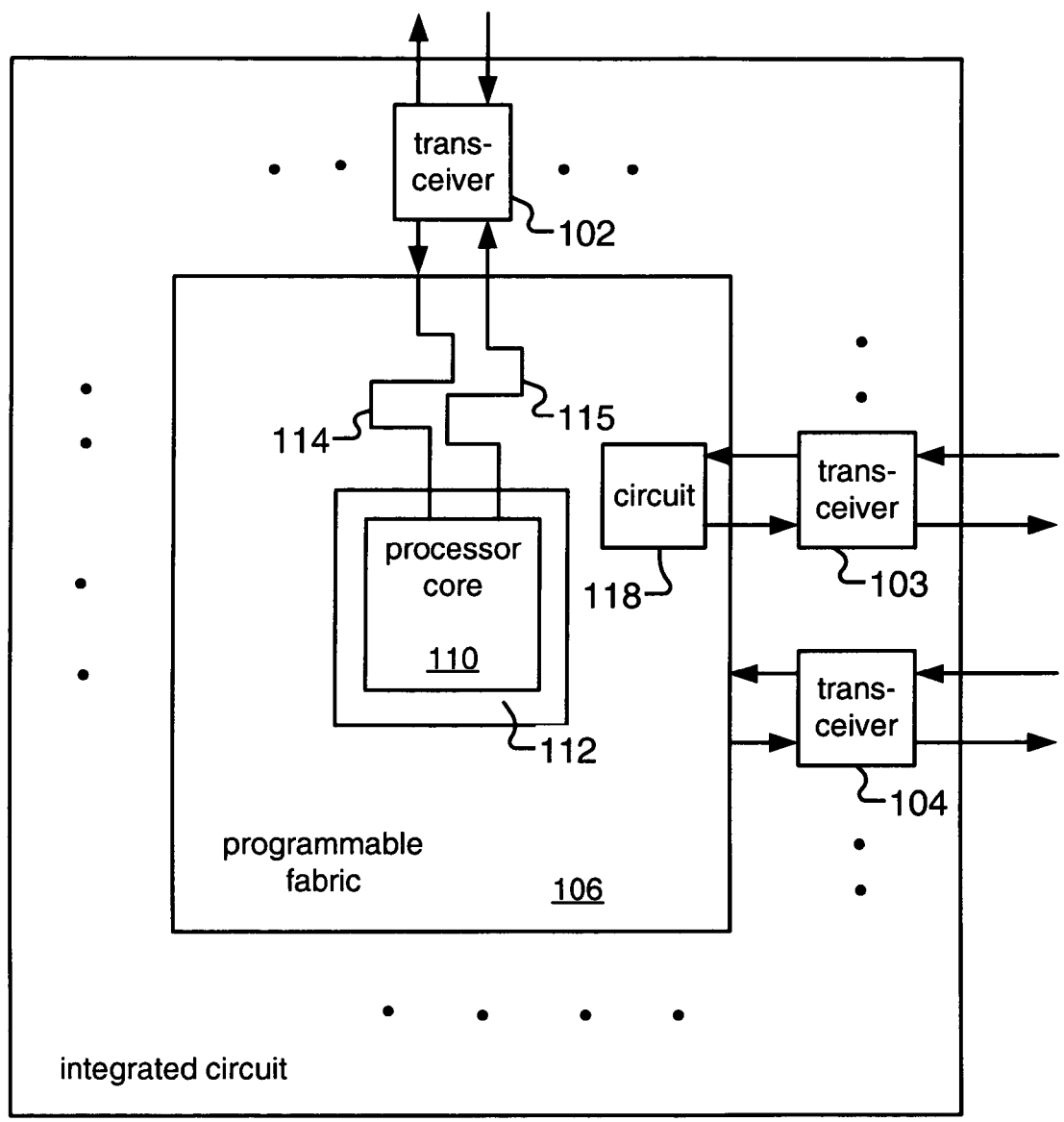
FIG. 1 is a simplified block of diagram showing a programmable integrated circuit in accordance with an embodiment of the present invention.

Referencing FIG. 1, an integrated system 100, such as a programmable logic device (PLD), may comprise a plurality of transceivers 102-104 to be interfaced with an embedded programmable fabric 106. In one embodiment, programmable fabric 106 may comprise a portion of a field programmable gate array (FPGA). Processor core(s), such as processor core 110, can be optionally embedded inside programmable fabric 106. Interface layer 112 may facilitate communication between embedded processor core 110 and fabric 106. Further referencing FIG. 1, a pair of paths 114-115 may interface transceiver 102 to processor core 110 through interface layer 112. Likewise, in an alternative embodiment, the functionality associated with the embedded processor might just as easily be realized in the fabric of the programmable logic device.

Further referencing FIG. 1, a user may configure a plurality of circuits in programmable fabric 106, which may also include portions to communicate with transceivers 102-104. For example, a circuit 118 of the programmable device may be coupled to communicate with transceiver 103. In particular embodiments, the transceivers (in addition to other logic devices and programmable fabric 106) may be configurable.

To assist configuration of the programmable logic device, a host programmer may include configuration data that may be programmed into configuration memory of the programmable logic device and used to configure the programmable resources of the device. Some of the configuration memory cells may structure interconnects of the programmable fabric 106, while other configuration memory cells may be used to configure transceivers (for example, 102-104). For example, the configuration memory cells may comprise different portions for configuring two separate transceivers, such as transceiver 103 separate from transceiver 104.

In accordance with particular embodiments of the present invention, the host programmer may program data into the configuration memory cells for interconnecting a first internal block memory to a transmitter of a transceiver, and a second internal block memory to a reference comparator. Other locations of the configuration memory cells may be used, e.g., to define interconnects and busses within the transceivers. Such selectable or programmable configurations might thereby include or exclude various sub-components of the transceiver that might otherwise be associated with the typical handling of data. Thus, a portion of the transceiver may be configured by the configuration data of the host processor to control operation of, for example, a clock recovery circuit, an elastic buffer, a decoder, or a cyclic redundancy coder.

Figure 2:
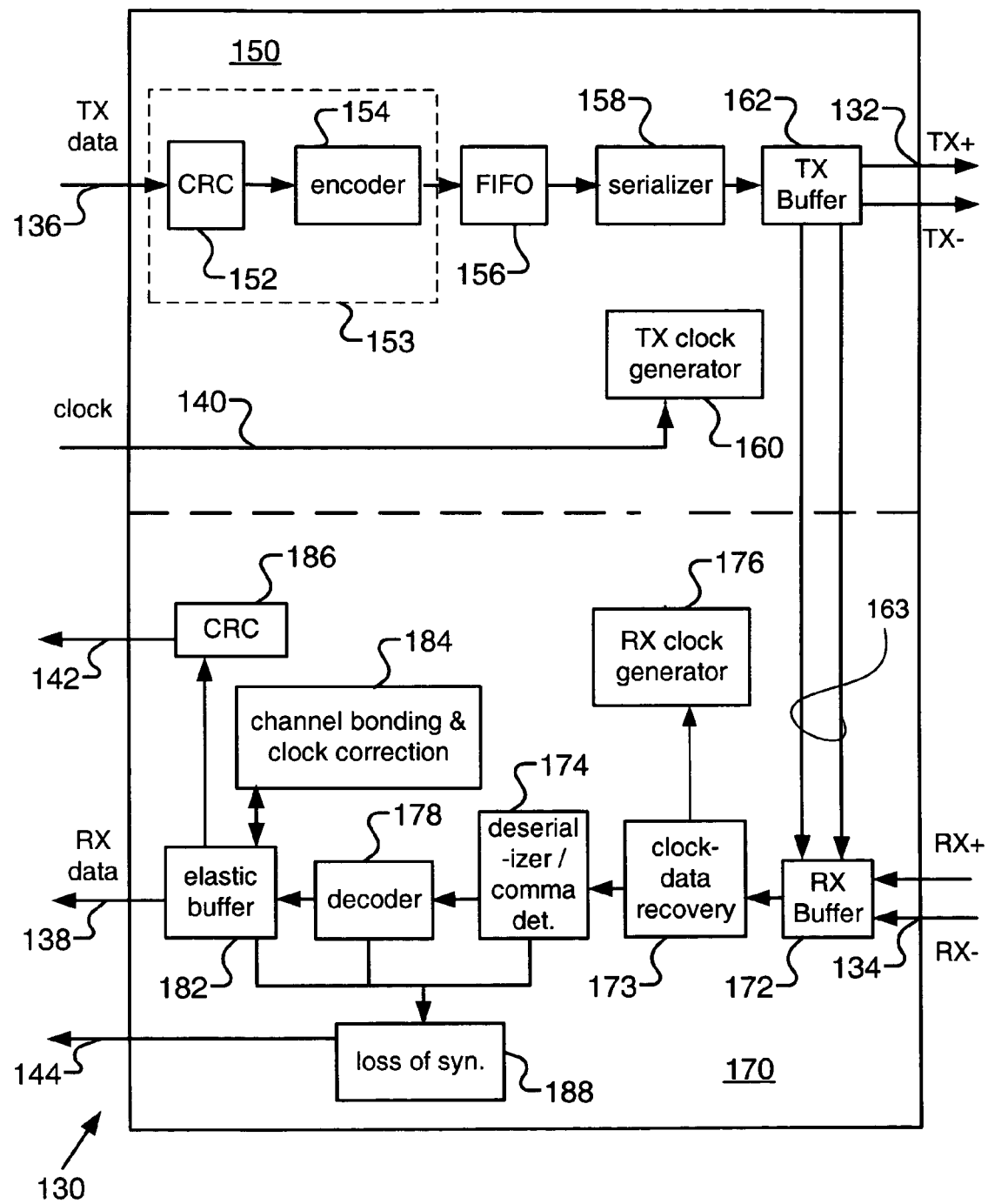
FIG. 2 is a blocked diagram showing an example of transceiver within a programmable logic device that may be used to generate random numbers in accordance with an embodiment of the present invention.

Referencing FIG. 2, an example of a transceiver 130 may comprise serial output and input ports 132 and 134 to communicate with another device. Output port 132 may propagate serial data of a differential output signal and input port 134 may receive serial data of a differential input signal. Transceiver 130 may process the data that is to be exchanged to/from internal circuits of an integrated system or data processor via the transmitter and receiver data busses 136 and 138.

A plurality of clock signals (shown collectively along signal line 140) may support clocking of data at the transmitter side of the transceiver such as at transmit buffer 162. At the receiver side of the transceiver, a clock recovery circuit may generate a tune signal for tuning a receiver clock generator for use in driving receiver buffer 172. Transceiver 130 may further comprise cyclic redundancy code (CRC) circuitry 186 of known protocol provisions for operating a CRC status signal 142.

In one embodiment, the width of the data paths 136 and 138 may be independently configurable and can be selected to be 1, 2, or 4 bytes. In other embodiments, the data paths 136 and 138 may have other widths.

Addressing the transmitter side 150 of transceiver 130, data on data path 136 may be selectably (or optionally) processed by a CRC generator 152. This CRC generator may compute and insert known CRC, such as encoding of a 32-bit CRC algorithm into data packets that are to be transmitted.

The resultant CRC encoded data may then be delivered to a non-return to zero encoder 154. In one embodiment, encoder 154 may comprise a known 8B/10B protocol encoder. Although a specific example of "non-return to zero" encoding may be disclosed for 8B/10B, it is understood that other embodiments may comprise alternative protocols— e.g., 64B/66B or others, or any combinations thereof. Returning to the particular example, the 8B/10B code may use 256 data characters and 12 control characters such as those that may be used in the Gigabit Ethernet, XAUI, Fibre Channel, and InfiniBand protocols. Such encoder may accept 8 bits of data along with a K-character signal for a total of 9 bits per character applied. If the K-character signal is "High", the data will be encoded into one of the 12 possible K-characters available in the 8B/10B code. If the K-character input is "Low", the 8 bits will be encoded as standard data.

The encoded data may then be delivered to a transmit FIFO buffer 156 and then to serializer 158. A clock of the internal system may drive operation of the encoder 154 and a higher frequency clock of clock generator 160 may drive serializer 158 and transmit buffer 162. In some embodiments, these two clock signals may be frequency locked. Although frequency locked, the two clock signals may have different relative phase relationships. Accordingly, transmit FIFO buffer 156 may be operable to absorb phase differences between the two frequency-locked clock signals.

FIFO buffer 156 may deliver data to serializer 158, which may then multiplex and convert the parallel data into a serial bit stream. Transmit buffer 162 may then drive the differential lines of output port 132 with the serial bit stream.

Turning now to the receiver side 170, transceiver 130 may further comprise a receiver clock generator 176 that may generate (e.g., recover) a reference clock for driving certain parts of the receiver. Receive buffer 172 may buffer the serial data of an input signal received from differential lines of input port 134. A clock-data recovery circuit 173 may receive the buffered data and serial data associated with the input signal. It may also recover a clock based on transitions of the data signal to establish a frequency and phase thereof correlated with the frequency and phase of the incoming serial data. This recovered clock may then be used for detection and recovery of the data for presentment to deserializer 174, decoder 178 and elastic buffer 182.

Deserializer 174 may convert data of a serial bit format into parallel digital data. In a further embodiment, deserializer 174 may also perform comma detection. In some decoding algorithms, (such as of the 8B/10B protocol), a "comma" may be used as a distinguishable pattern by which to assure determination of the byte boundaries and frames within the serial data. For example, two comma patterns of known 8B/10B protocol may comprise a comma "plus" and a comma "minus". Detection of a comma may then define the byte alignments within the received serial bit stream. In one embodiment, programmable cells of the configuration memory may establish the control signals to control whether the comma detection circuit is to realign the byte boundaries on comma plus, comma minus, both, or neither.

In exemplary operation, decoder 178 may receive data from deserializer 174. When enabled, it may decode and, in accordance with its selected configuration, raise a synchronous "comma" flag (as a status bit to be attached to each received byte at the transceiver's programmable fabric interface) on comma plus only, comma minus only, both, or neither. In further embodiments, it may set this flag for valid commas only.

Upon leaving decoder 178, the decoded data may be sent to an elastic buffer 182. Elastic buffer may perform channel bonding and clock correction as driven by clock correction controller 184. Elastic buffer 182 may be configurable for various configuration options such as:

(a) use or bypass;

(b) enablement of clock correction; and (c) levels to signal overflow or underflow conditions.

Configuration options might also include choice of channel bonding modes, the selection of a selectable number of channel bonding sequences, establishing a selectable length for matching a selectable byte value (8-bit or 10 bit), and similar provisions for clock correction sequences.

After re-synchronization by the elastic buffer, the data may then be delivered to an internal system, such as the programmable fabric, across data bus 138, which may be programmed for a 1, 2, or 4 bytes width.

In further embodiments, the transceiver may also comprise an elastic buffer 182 that may be optionally connected to a known CRC verification block 186. This block may, for example, verify that the commonly used 32-bit cyclic redundancy code appears at the end of the received data packets. A signal may then be delivered to the internal system on line 142 to indicate the CRC verification.

Transceiver 130 may further comprise a loss of synchronization detector 188. It may interpret outputs of comma detector 174, decoder 178, and elastic buffer 182 to determine whether the incoming bytes of the data stream are in synchronization. A signal may then be delivered to the programmable fabric on line 144 to report the synchronization status.

Again, for a programmable logic device, the configuration information for configuring the transceivers may be stored in known programmable configuration memory.

Accordingly, a user may select different options for the programmable logic device based on the configuration data provided to the FPGA.

Although showing the most important signals and sub-components of the transceiver for assisting understanding of the present invention, it will be understood that there may also be other signals and sub-components to the transceiver.

The integrity of data detection and recovery within a transceiver may depend to a great extent upon the jitter performance associated with the transceiver. For example if a serializer and transmit buffer add jitter to a data communication signal, then a receiver receiving that signal may incorrectly detect zero data as a one, or conversely one data as a zero. Similarly, if the receive buffer of a receiver contributes noise to the received input signal, then again data errors may result. Accordingly, the jitter performance of a high-speed transceiver within a device, such as a field programmable gate array, may determine its reliability for serial data transfer applications. Further, it may comprise different error probabilities with different serial data transfer rates—e.g., 3.125 Gbs per second vs. 2.5 Gbs per second.

Processes for testing the performance of transceivers may use various test patterns such as the XAUI jitter test standards of the IEEE (see draft to IEEE standard 802.3, annex 84 of, IEEE draft P 802.3ae/D2.01, Jan. 15, 2001, discussing various test patterns and procedures of the XAUI jitter working group). In some cases, the methods for testing transceivers may generate and apply the test patterns to a transmitter channel, while logging recovered data received by the receiver channel. Reliability might then be determined based on subsequent analysis of the logged data relative to the initial test patterns.

In the fields of microwave digital communications, microwave digital radios, cell phones, optical devices, and wireline digital interfacing, procedures disclose testing communication units in regions of enhanced error probability. Borrowing from these fields and recognizing certain principles of error probabilities associated with serial data receiver embodiments, the present disclosure proposes methods and systems for generating random numbers that can take advantage of some of these recognized features.

Figure 3:
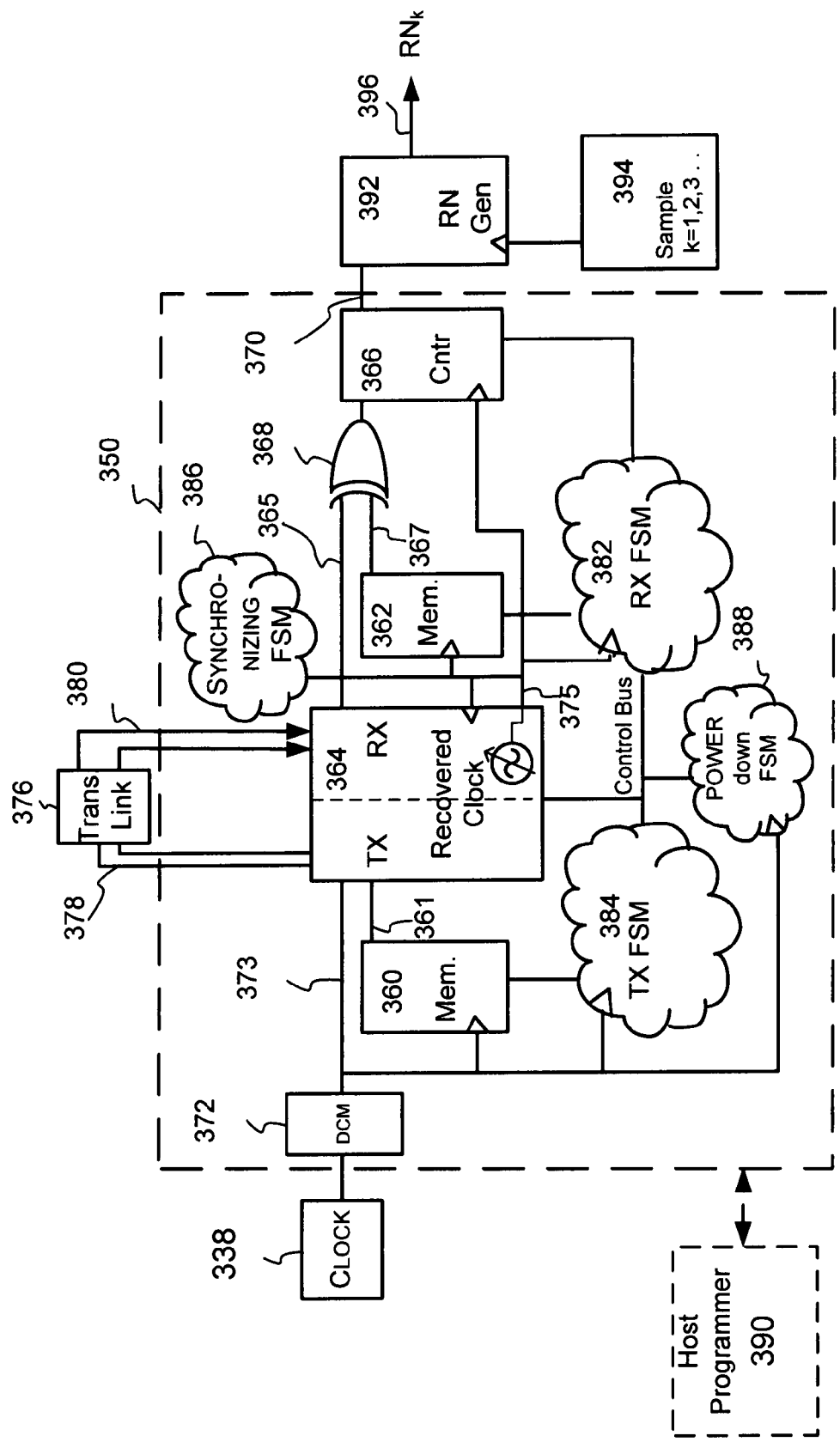
FIG. 3 is a blocked diagram showing a system for generating random numbers in accordance with an embodiment of the present invention.

Referencing FIG. 3, in accordance with an embodiment with the present invention a programmable logic device 350 may comprise transceiver 364 (which may be similar to transceiver 130 of FIG. 2) coupled with other programmable elements for exercising and/or stressing its jitter capability. A digital clock manager 372 may receive a signal from an external source 338, and be programmed for generating an internal clock having a frequency useful for driving certain internal logic of the programmable logic device 350 via line 373. In a particular example, the external source 338 may supply a frequency of 50 MHz and the digital clock manager 372 may be configured to synthesize an internal operating frequency of, for example, 156.25 MHz. Further, the digital clock manager may comprise an internal phase lock loop for locking and controlling its frequency relative to the frequency of the external source. For assisting an understanding of certain principles of the present invention, an internal operating frequency of 156.25 MHz may be assumed along with a 20 bit width for data words supplied to the serializer 158 (FIG. 2) associated with the transmission channel of the transceiver 364. The output signal produced on serial output 378 might thus comprise a data transfer rate of up to 3.125 Gbs (20 bits x156.25 MHz). Although particular examples may be described with certain frequencies herein to assist an understanding of the present invention, it will be understood that the frequencies and data transfer rates might be other than the 50 MHz external (or in some cases internal) source, the 156.25 MHz internal frequency and the 3.125 Gbs data transfer rate used in the examples. Further, alternative methods and embodiments may substitute the internal clock manager with an internal frequency synthesis unit.

Further referencing FIG. 3, state machines 382, 384 can provide known operable control along internal control busses that may be configured to assist access of first and second block memories 360, 362. The transmitter state machine 384 may be configured to sequence the address map of first block memory 360 in order to retrieve predetermined test data previously stored within the memory, which can be propagated by transmitter data bus 361 to the input of the transmitter. On the receiver side, the receiver portion of the transceiver may operate to recover data. The receiver state machine 382 may control indexing within the address map of second block memory 362 by which to retrieve sequences of reference data for comparison by comparator 368 relative to the data recovered. Digital clock manager 372, which provides an internal clock, may drive the transmitter state machine, while the receiver state machine 382 may be driven by a recovered clock.

Power-down state machine 388 can be used to assist power cycling and initialization of circuits within the programmable logic device 350, which can assist certain optional procedures of performance testing and/or the jitter variation.

Synchronizing state machine 386 can determine when a known framing event has been detected by the receiver and may establish an offset for an index into the address map of the second block memory 362 relative to the index for accessing the first block memory 360. With an appropriate offset, reference data sequences retrieved may correspond to those of the predetermined test data that are expected from the received data. In other words, the synchronization state machine can fix an offset between the different indexes of the block memory 360 on the transmitter side and the block memory 362 on the receiver side so as to effectively accommodate delays of the overall data communication channel.

Although particular embodiments are described above with state machines that may sequence various operations of the sub-modules, it may be understood that alternative embodiments may comprise, e.g., an embedded processor for performing these operations. Such internal processors may be programmed with machine-readable instructions that when executed may perform procedures as may be disclosed herein relative to the state machines.

Referencing FIGS. 2 and 3, delays of the data communication channel may include those of FIFO registers 156, serializing multiplexer 158, and transmitter buffer 162 on the transmitter side; delays of the transmission link 376 (or internal link 163) between the transmitter output 132 and the receiver input 134; and delays of receive buffer 172, clock-data recovery circuit 173, de-serializing/de-multiplexer 174, decoder 178 and FIFOs or elastic buffers 182 on the receiver side. Each of these elements associated with the transceiver can contribute to the overall latency (propagation delay) between the moment data is presented by first block memory 360 to interconnect 361 for transmitter input 136 and the moment it may be recovered at the receiver's output 138 and provided over interconnect 365 to comparator 368. It may be noted that each of these same elements may be similarly capable of contributing an accompanying jitter component that may accompany their respective delay duration. Assuming identical data contents of the first and second block memories 360 and 362, the index into the address map of the second block memory for retrieval of the reference data may, therefore, be understood to require an offset (of perhaps multiple frames) relative to the indexing into first block memory for compensating transmission FIFOs, multiplexers, de-multiplexers, receiver FIFOs and buffers, elastic buffers, etc. and, in general, to correlate appropriately the retrieval of the reference data relative to data recovered by the receiver.

Figure 4:
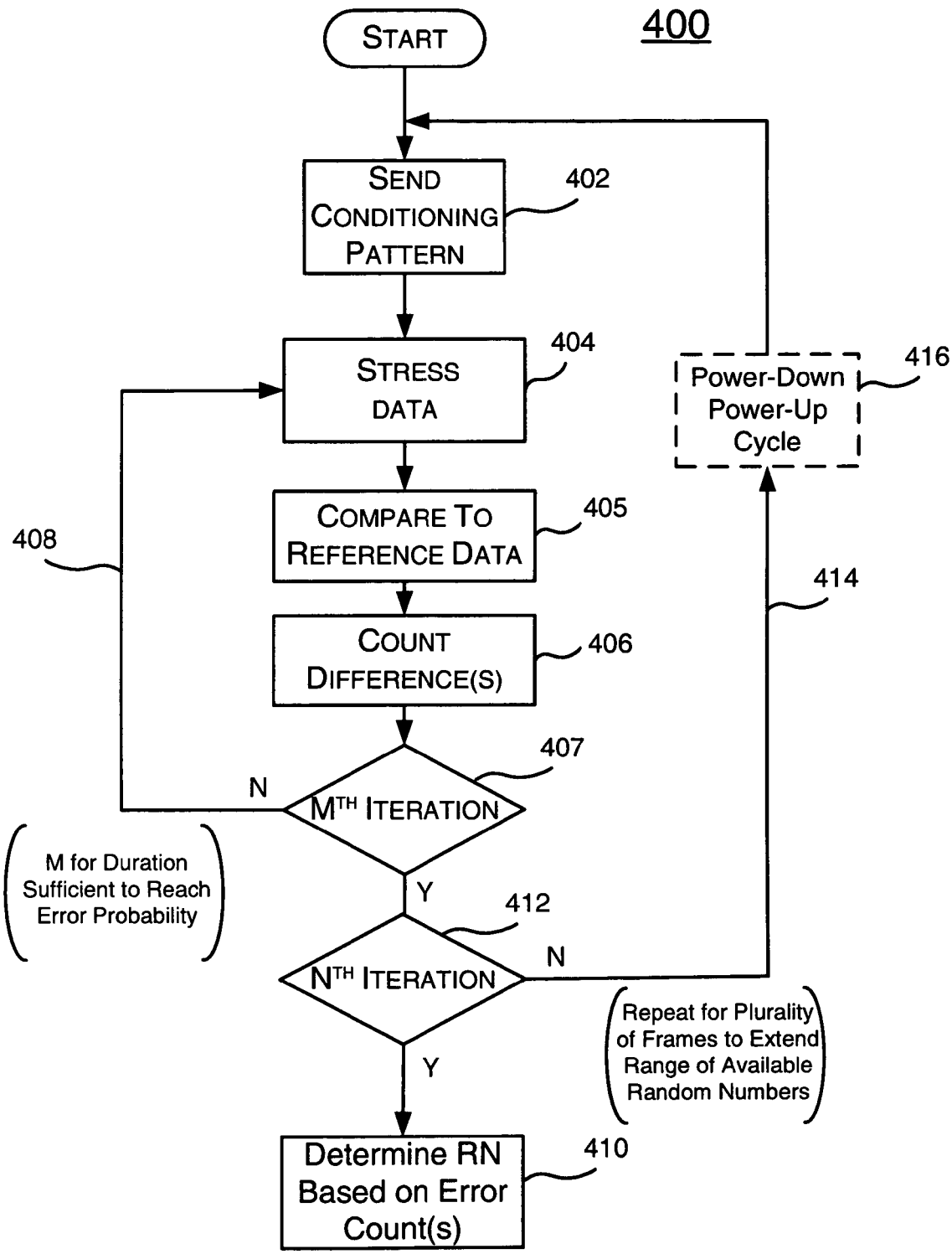
FIG. 4 is a simplified flow chart showing an exemplary method for generating random numbers in accordance with an embodiment of the present invention.
Figure 5:
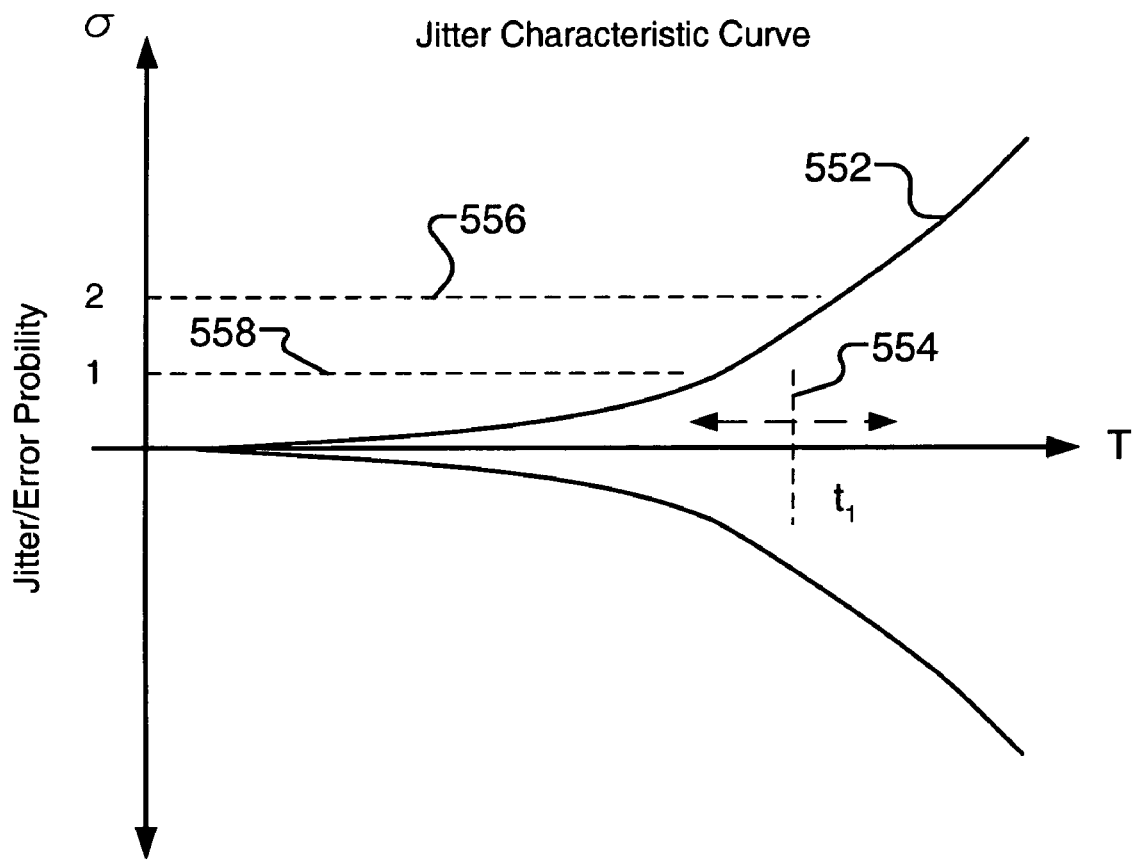
FIG. 5 is a graph showing a jitter characteristic curve useful for describing a method of testing in accordance with an embodiment of the present invention.

In one embodiment for a method of operating the transceiver for jitter effects, referencing FIGS. 3-5, first and second block memories 360 and 362 may be previously programmed with substantially the same identical internal data. First memory block 360 may be programmed with first (e.g., test) source data that may be retrieved and transmitted to the transmitter portion of the transceiver. Second memory block 362 may be programmed with reference data that may be the same as the predetermined source data and may be retrieved with the previously described relative offset for allowing the correlated/delayed presentation to comparator 368. In a particular embodiment, transmitter data bus 361 may comprise a width (e.g., 20 bits) for propagating words of parallel bit format from the memory to the transmitter. Likewise, the second block memory 362 may be coupled via bus 367 to the reference port of the comparator 368 using an interconnect width (e.g., 20 parallel bits) corresponding to that of the receiver's data bus 365.

A host programmer 390 may be operable to program configuration memory of the programmable logic device to configure its various modules, including those of transceiver 364, and may be further operable to configure the transceiver in coupled relationship to memory blocks 360, 362 and respective configurations for state machines 382, 384, 386 and 388, digital clock manager 372, comparator 368, and counter 366 as illustrated by the example in FIG. 3. The host programmer may further configure data sequences that may be stored into the first and second block memories 360 and 362 for their respective source and reference data.

Upon initiating a method 400 for random number generation, further referencing FIGS. 3-4, data words of the predetermined source data may be retrieved sequentially from first memory block 360 and output (e.g., 20 parallel bits at a time) to transceiver 364. Turning to FIG. 2, the transmitter 150 may receive the parallel data on its input data bus 136 and may process the data for serial output at output 132. In embodiments of the present invention, selectable or configurable encoders 153—such as those for error redundancy (cyclic redundancy coder 152) or non-return to zero encoding (encoder 154)—may be configured by host programmer 390 to be selectively bypassed within the transmission channel. In such configurations, data words received from the first block memory can be propagated directly to FIFO registers 156 and serializing multiplexers 158. Accordingly, stress sequences of, e.g., same-state data may be transmitted directly from the block memory for transmission. By such configuration, the stress sequence may comprise durations substantially longer than the run-lengths that would otherwise be provided per the typical encoding circuits.

In a particular embodiment, the host programmer may configure the predetermined source data to comprise a conditioning preamble followed by a stress sequence. Therefore, when retrieving contents of the first block memory during the method of random number generation, a conditioning preamble may be sent (step 402) to the transmitter followed by (step 404) the stress sequence.

Data serialized may then be transmitted to the receiver of the transceiver. In a particular embodiment, transmission line 376 of predetermined delay may propagate the signal from the transmitter output 378 to the receiver's input 380. Assuming words comprising a width of 20 bits from first block memory and assuming an internal clocking frequency of about 156.25 MHz, a serial data transfer rate (between the transmitter and receiver) may be established at about 3.125 Gbs. To assist some customary methods of jitter performance testing, and to provide flexibility for optional selectable alternatives that may accompany some of the embodiments of the present invention, the transmission line 376 may provide an electrical delay sufficient to enhance certain forms of jitter to affect bit error rate (BER) or probability. In one example, the transmission line may be configured with an electrical length greater than five wavelengths (5×) of the frequency associated with the rate of serial data transfer. For a serial transfer rate of 3.125 Gbs, e.g., the transmission line might thus comprise a transmission line structure on an FR-4 substrate (PC board) of about 20 inches physical length. Although a system for random number generation might be configured in this fashion with transmission line 376 to affect jitter parameters, in accordance with some embodiments of the present invention, such external interconnect can be omitted.

Further referencing FIG. 2, for a self-contained embodiment, for example, the host programmer of a system for true random number generation may program configuration memory of the programmable logic device 130 to configure an internal link 163 (e.g., via resources of the programmable fabric of the programmable logic device) to couple between the output of transmitter buffer 162 and the input of the receiver buffer 172. With such link configured within programmable logic device 350, the true random number generation may be realized conveniently, self-contained from within the device.

Affecting some of the jitter characteristics on the receiver side, clock recovery circuitry (173 FIG. 2) may recover a clock based upon transitions of the data input signal. In a particular embodiment, the clock recovery circuit may comprise a phase lock loop for locking a frequency/phase of the receiver's clock generator 176 relative to the frequency/phase accompanying the transfer rate of the received input signal. As input transitions are received, the time relative placements thereof may be compared with respect to transitions of the recovered clock for generating a phase error signal. The phase error signal might then be used to generate a feedback control signal for correcting the frequency/phase of the recovered clock. During a preamble sequence of the serial data associated with the received serial signal, repetitive data state transitions can assist tight closed-loop control of the frequency/phase of the receiver's clock generator. Following the preamble conditioning, however, a stress sequence may present same-state data over an extended time lapse. Absent the repetitive signal transitions of the input signal, the phase lock loop may essentially leave the clock generator of the receiver free-running. Relative to FIG. 5, this may be effectively viewed or modeled so as to shift the operational sampling transitions within the data detector circuitry 173 into time-lapse, stress regions 558-556 along a jitter characteristic curve 552 of greater jitter of error probability.

In accordance with one embodiment of the present invention, a run-length ti may be determined along a time interval 554 of the jitter characteristic curve 552 for a typical transceiver device and the run-length selected to extend the data recovery provisions of the receiver into an error probability growth region. The determination may be performed by logic pre-configured within the fabric of the programmable logic device, or the determination may be performed by a processor external or internally embedded with the programmable logic device.

The growth region of the jitter characteristic curve may be known as a "waterfall" or "avalanche" zone. When working within such "waterfall" zone, the receiver's data recovery/detection circuitry may perform with a bit error rate of, e.g., about one to two bit-errors per frame sequence or higher. In particular embodiments, the stress sequence for the predetermined source data may be configured based upon the desired run-length determination. In a particular embodiment, a host programmer may configure the stress sequence with 400 consecutive zeros, which may be programmed into the first memory block. It may be understood, however, that alternative embodiments may comprise values or patterns other than 400 consecutive same-state data and may also extend the run-length beyond the maximum lengths typically specified by a non-return to zero protocols (e.g., 8B/10B encoding protocol).

In a further embodiment, the preamble preceding the stress sequence may be configured for a low stress sequence such as 1-1-0-0-1-1-0-0- . . . or 1-1-1-0-0-0-1-1-1-0-0-0- . . .

Such a sequence may have a sufficient number of transitions to enable the clock recovery circuit to acquire lock for synchronizing frequency and phase, but may have a frequency less than the high frequency transition rate of a sequence such as 1-0-1-0- . . . , which might overburden edge detection circuits associated with preliminary clock recovery operations for acquisition. The low-stress pattern for the data may be sustained sufficiently for a plurality of data frames sufficient to establish a stable operating condition of the transceiver before launching into the stress sequence of the source data. For example, the conditioning pattern may comprise a low-stress, alternating sequence for pairs of ones and zeros for duration of 200 frames (e.g., 4000 sequential bits). This value may be altered in alternative embodiments, so long as it may establish a conditioning duration to allow settling of clock recovery circuit dynamics and settling of other control loops as may be associated with modules of the receiver circuitry, e.g., deserializer 174 and elastic buffer 182, in the transceiver.

Continuing with further reference to FIGS. 3-4, after sending the stress sequence and while receiving it at the receiver, the recovered data may be directed to comparator 368. Corresponding sequences of reference data may be retrieved from the second block memory 362 for comparison (step 405) with the recovered data. If an error is determined by comparator 368, the error may be counted (step 406) by counter 366.

The sending of the stress sequence, receipt, comparison and error counting can be repeated for M iterations (steps 407, 408) and the counter 366 may obtain a cumulative error count from the various repeats. In a particular embodiment, the number of iterations (e.g., i from 1 to M) may be set to impart an error probability per the jitter characteristics of the receiver or receiver's clock recovery oscillator for a magnitude greater than zero and less than one. In one example, a transmission line of about 20 inches may be provided between the transmitter and the receiver and a run length of about 400 same state zeros or ones may be sufficient to reach an error probability growth region of the jitter characteristic curve. Assuming 20 bits per word comparison, M would correspond to 20 (i.e., 400/20) for assuring 20 iterations of the stress, compare, and count (steps 404, 405, 406) per iterative repeats 407. Assuming a 156.25 MHz internal operating frequency and word comparison rate, the overall run-length would correspond to about 128 ns (20*(1/156.25 MHz)).

In an alternative example per the particular assumed error probability region desired from a jitter characteristic curve, the transmission length may be extended from 20 inches to 80 inches and the run length might be reduced to less than 400 zeros/ones.

In yet another example, the embodiment may be self-contained with a link configured to couple between the transmitter and the receiver, for example, within a programmable logic device. For such example, 1000 same-state data might then be provided for the stress sequence of the serial input signal for establishing the run-length to reach the desired error probability region of the previously assumed jitter characteristic curve of the previous example. With 20-bit words per comparison, M would correspond to 50 (i.e., 1000/20 bit words) and the run length would be about 320 ns (50*(1/156.25 MHz)).

Again, it may be noted that the number of zeros/ones required may change from one system to another dependent on the overall contributing parameters of each system. In one system, the clock recovery circuit may comprise great stability while in another, the stability may be degraded by noise, noisy components, low quality oscillators of the clock recovery circuit, etc. Accordingly, while M may be equal to 50 in one example of an embodiment, it might be set to 75 or 80 in other separate devices for reaching sufficient error probability therefor by which to assure a given level of randomness for the true random number generation.

Upon concluding M iterations with the stress sequence, the whole sequence of iterations may be repeated. In some optional procedures, the repeat may incorporate a power cycle (step 416) (power-down and power-up of the transceiver) between the different runs. The power cycle may reset circuits of the transceiver before launching into another stress sequence. If using a power cycle, the procedure might again synchronize the receiver clock recovery and reference data offset using the preliminary preamble provisions. It might then again proceed into the iterations of stress sequences, comparison, counting (steps 404-408).

In particular examples, the power cycle may cause a phase lock loop of the clock recovery circuit to release lock of the receiver clock generator (176 FIG. 2). Upon power-up, the phase lock loop may then restore its phase-lock condition and may exercise an alternative lock condition. For some programmable logic devices, the phase lock loop may perform differently for different lock states. Therefore, the repeats with power-cycle can allow the phase lock loop to acquire phase-lock at different relative lock placements, which in turn can affect performance of the transceiver and overall error probabilities for impacting the randomness associated with generating the numbers of the true random number sequence. Therefore, a plurality 412, 414, 416 of the overall stress runs N can be performed to impart breadth and variation from different operating conditions into the randomness of the accrued error counts. Upon completing the N overall iterations, the error count from the counter 366 may be retrieved and used to define (step 410) a number of a true random number sequence.

In one example, a register 392 may read at least a portion of bits 370 of counter 366—e.g., the least significant 8 bits—which may be sampled after the N runs of the M stress iterations. Sampling controller or source 394 may drive register 392 with a strobe or clock edge to enable the register to sample the selected bits of the counter. In a particular embodiment, the sampling controller or source 394 may comprise a signal of a serial interface, e.g., of an RS-232 controller. Such controller could be either external or internal to the overall integrated circuit device 350.

Sampling controller or strobe source 394 may provide a sampling frequency much less than the frequency associated with the M iterations of the stress sequence 404-408. With sufficient duration between sampling events of sampling controller 394, further variation or randomness may be imparted to the outputs sampled from counter 366. In a particular example for an RS-232 sampling embodiment, the sampling frequency may comprise a frequency of about 19.2 kHz. It may be noted that the period (T) associated with 19.2 kHz is equal to 1/19.2 kHz or 0.052 ms. It may be noted further to thus encompass a multitude of word comparisons—i.e., over 8000 word comparison and counts per sampling in the generation of the true random number sequence where the words=(1/19.2 kHz)/(1/156.25 MHz)=8125.

Although described in this example with a 19.2 kHz sampling frequency, e.g., of an RS-232 serial interface, alternative embodiments may comprise a sampling frequency other than 19.2 kHz while encompassing a multitude (e.g., hundreds, thousands or tens-of-thousands) of word comparisons per sampling. In a further embodiment, the RS-232 serial interface may sample the least significant bit(s) of the counter's output.

In some cases, it may be desirable to increase the rate of generation of the numbers for the true random number sequence. For some of these, the pattern of the predetermined source data may be changed to provide, e.g., a longer run-length to obtain more errors per round of stress iterations. In other embodiments, the serial data transfer rate may be increased to stress the clock recovery capabilities and/or the data resolution of the data detector. This similarly may have the effect of increasing the number of errors per round of stress iterations. In a further embodiment, the counter may count the number of actual bit errors instead of the number of words resulting in error determinations.

In another embodiment, a plurality of Multi-Gigabit Transceivers may be configured into separate respective true random number generators, such as of those described previously relative to FIGS. 2-6. The numbers resulting from the plurality may thus be integrated together into a true random number sequence of greater frequency and greater number of random numbers within the overall sequence.

In yet another embodiment, the error probability may be further affected by attenuation of the serial data signal so as to reduce the amplitude of the signal to be available at the receiver. Further, the amount of pre-emphasis supplied by the transmitter may be adjusted when outputting the serial data signal. Each of these might also be adjusted to influence the error probability and affect a desired performance level.

In one embodiment, further referencing FIG. 3, the bits sampled from counter 366 may be latched into register 392 and may drive output 396 directly with the value of the latched bits for the random numbers of the true random number sequence. In an alternative example, a timer may determine the amount of time required for the counter to reach a certain threshold count. The variation in the timer values might then serve as the basis for the random numbers to be generated.

In an alternative embodiment, the bits sampled from the counter may act as seeds to known seed based random number synthesis procedures. In such embodiments, the latched values might thus be retrieved by, e.g., an embedded processor that may determine the numbers to a random number sequence based on the retrieved random values for the seeds. Although described in this example as being retrieved and acted upon by an embedded processor, in alternative embodiments, the sampled value may be delivered to logic circuits that have been pre-configured within the fabric of the programmable logic device or to an external processor or system for synthesizing the random number sequence based on the generated seeds.

Figure 6:
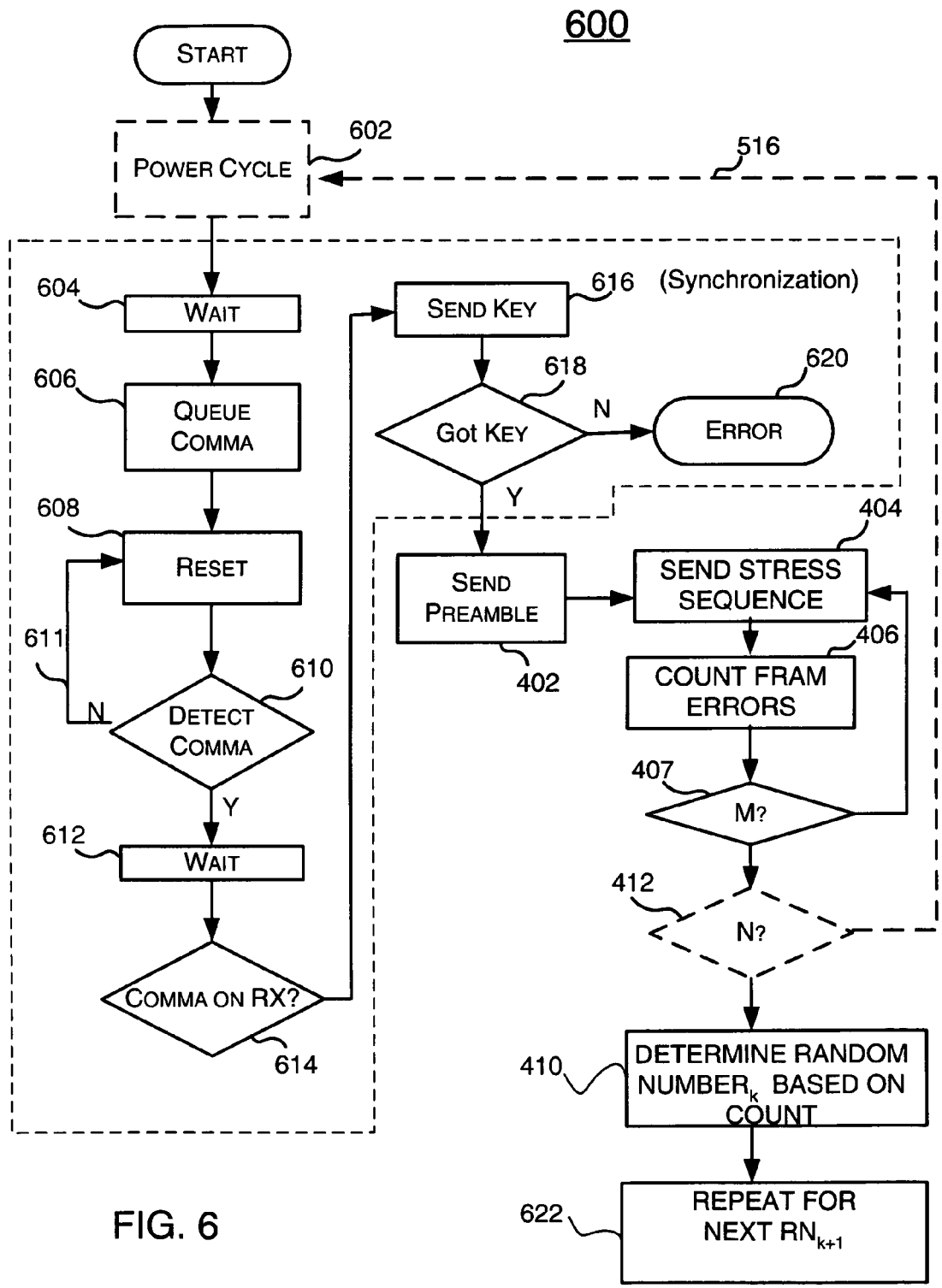
FIG. 6 is a flow chart showing another exemplary method of generating random numbers in accordance with an embodiment of the present invention, and showing some provisions for synchronization.

In a further embodiment of the present invention, referencing FIGS. 2, 3 and 6, a method 600 of generating random numbers may (optionally) begin with a power-down and power-up (power cycle step 602) of a multi-gigabit transceiver. After waiting (step 604) for a brief duration, a framing event may then be placed (step 606) onto the transmitter's data bus 361. This framing event may be incorporated as part of the predetermined test data, which may have been previously configured by the host processor and stored within the first block memory 360. The framing event may be of a given serial data transfer protocol, e.g., 8B/10B encoding protocol, and can be disposed within the predetermined source data before the stress sequence and before the conditioning preamble. In the case of the 8B/10B protocol, the framing event may comprise a comma.

Further referencing FIGS. 2 and 6, after placing the comma on the transmitter bus 361, a reset 608 may be performed for the transmitter and receiver to clear any queuing registers—e.g., FIFOs 156 and elastic buffers 182 and data recovery circuits 174, 178. The host processor may then monitor (steps 608, 610, 611) the protocol detection circuitry of deserializer 174 for detection (step 610) of a comma event (framing event). If the comma has been detected at the transmission side, the process may then proceed to determining (step 614) a comma at the receiver. The wait (step 612) may first be provided to account for propagation delays of the receiver buffer 172, data-clock recovery circuit 173, and the deserializer and decoder circuitry 174, 178. In some embodiments, the wait duration may be set for as long as about 64 cycles.

Next, in further embodiments, a key may be submitted (step 616) for transmission between the transmitter and the receiver. The key may comprise an extended pattern (e.g., 80 bits or four frames of data) of little stress. This may assure that the data can be transmitted through the communication channel, and also to locate relative indexes between the respective first and second block memory addresses. Once the framing and key events have been detected (step 618) at the receiver side, synchronization state machine 386 (FIG. 3) may appropriately fix the offset between the index to the reference data relative to that for retrieving the source data for placement on the data bus for the transmitter. In the event the key data is not recovered at the receiver, an error may be, reported (step 620).

Up to this level, the procedure may be viewed as having established a first tier of operability—e.g., verifying the fundamental operations of the transmitter's multiplexing and transmission, and also the fundamental operations of the receiver's data recovery, de-multiplexing and frame/key detection. Upon completing the synchronization adjustments and/or the phase lock loop acquisition, the method of random number generation 600 may proceed with the procedures 402-416 as described previously herein with reference to FIG. 4. Upon determining (step 410) a random number $RN_k$ based on the number of error counts or the timing between errors, the sequence may be repeated (step 622) for another run and determination of another random number $RN_{k+1}$ of the sequence.

Further referencing FIG. 6, it may be noted that the loop back 516, power cycle 602, and synchronization process 604-620 may be optional. In some embodiments, these power cycling and re-synchronizing provisions are not performed between different groupings of the stress iterations. For some of these, the preamble that precedes the stress sequence may be sufficient to re-synchronize the clock recovery circuits of the transceiver's receiver and data recovery circuits.

In another embodiment of the present invention, a true random number generator apparatus or method of an embodiment described herein above may be used to assist signal encryption. Numbers of a generated true random number sequence may be used to encrypt a signal for secure transfer. In a particular example, the numbers from the true random number sequence may be used directly as the encryption key. This sequence of numbers can be retained and sent to a receiving station, where it may then serve as a decryption key. In another embodiment, the numbers generated may be used indirectly, e.g., as seed values, for driving an encryption or decryption protocol. Having described a few cryptography examples, it may be further noted that many cryptography algorithms and methods may employ a true random number generator and/or method as described above for use in generation of true random numbers so as to facilitate security of encryption/decryption techniques and systems in accordance with further embodiments of the present invention.

While certain exemplary features of the embodiments of the invention have been illustrated and described herein, many modifications, substitutions, changes and equivalents may now occur to those skilled in the art. It is, therefore, to be understood that the appended claims are intended to cover all such embodiments and changes as fall within the spirit of the invention.

I claim:

1. A true random number generator comprising:
    a receiver to receive a signal comprising a predetermined source data;
    a recovery circuit to recover data from the received signal;
    a controller to sufficiently stress the recovery circuit such that at least a portion of the recovered data differs from respective portions of the predetermined source data; and
    an extractor to define a random number based upon differences between the recovered data and the predetermined source data,
    wherein the extractor comprises:
        a comparator to compare and determine errors between the recovered data and reference data related to the predetermined source data;
        a counter to count the errors determined by the comparator; and
        a sampler to sample at least a portion of the bits of the counter to define the random number.

2. The true random number generator of claim 1, in which:
    the receiver and the recovery circuit comprise a clock recovery circuit; and
    the controller is operable to influence at least one of data transfer rates of the signal directed to the receiver, a number of sequential same-state data bits of the predetermined source data, and stability of the clock recovery circuit for establishing the stress.

3. The true random number generator of claim 2, further comprising:
    a first memory to source the predetermined source data;
    a data transmitter to receive the predetermined source data from the first memory and output the signal comprising the predetermined source data to the receiver; and
    a second memory comprising the reference data to be supplied to the comparator, the reference data substantially the same as the predetermined source data.

4. The true random number generator of claim 3, wherein the data transmitter and the receiver form part of a multi-gigabit data transceiver embedded within a programmable logic device, the programmable logic device comprising a configurable link coupled between the receiver and the transmitter.

5. The true random number generator of claim 1, wherein the extractor defines the random number based on an interval of time required to reach a predetermined number of differences between the recovered data and the predetermined source data.

6. A true random number generator comprising:
    a transceiver;
    a jitter performance tester to exercise the transceiver with predetermined data;
    the jitter performance tester pre-configured to stress the operability of the transceiver for increasing an error probability of the transceiver; and
    an extraction circuit to obtain a random number sequence based on differences between the data resolved by the transceiver and the predetermined data,
    wherein the extraction circuit comprises a sampler to sample at least a portion of an output of the jitter performance tester.

7. The random number generator of claim 6, the jitter performance tester to control at least one of the data of the predetermined data and an associated data transfer rate to influence the error probability.

8. The true random number generator of claim 6, in which:
    the transceiver comprises a receiver to receive and recover data from a data signal comprising the predetermined data, and to format the recovered data into data words;
    the jitter performance tester comprises:
        a comparator to compare and determine differences between the recovered data words and respective data words associated with the predetermined data; and
        a counter to count a number of differences determined by the comparator; and
    the extraction circuit to determine numbers for the random number sequence based upon counts determined by the counter over respective durations of the predetermined data,
    wherein the output of the jitter performance tester comprises bits of the counter.

9. The true random number generator of claim 8, in which the duration associated with each count encompasses a plurality of comparisons performed by the comparator.

10. The true random number generator of claim 8, in which the transceiver, the jitter performance tester, and the extraction circuit are embedded within a programmable logic device.

11. The true random number generator of claim 8, further comprising first memory to source the predetermined data, and second memory to source the respective data words of the predetermined data to the comparator.

12. The true random number generator of claim 11, in which the transceiver further comprises a transmitter to obtain data from the first memory and output the data to the receiver.

13. The true random number generator of claim 12, further comprising a RS-232 interface to sample at least a portion of the counter, with a sampling rate less than a data transfer rate of the transmitter.

14. The true random number generator of claim 8, in which the extraction circuit is operable to define the random number sequence based upon a number of bit differences determined by the comparator.

15. The true random number generator of claim 8, in which the extraction circuit is operable to define the random numbers based upon the respective durations required to produce a predetermined number of difference counts as determined by the comparator and the counter.

16. The true random number generator of claim 6, the extraction circuit to enable the sampler once every counter duration.

17. The true random number generator of claim 16, the extraction circuit operable to control length of the durations.

18. A method of generating a random number, comprising:
providing first data based on reference data;
comparing the first data to the reference data and determining differences therebetween;
counting the differences determined;
sampling at least a portion of the counting over a duration; and
defining the random number based on the sampling over the duration,
wherein the first data is related to the reference data with an error probability.

19. The method of claim 18, further comprising:
recovering data from a data signal; and
using the recovered data for the first data of the comparing;
the data signal comprising data substantially the same as the reference data; and
the recovering comprising the error probability greater than zero and less than 1.

20. The method of claim 19, further comprising influencing jitter performance of the data recovery.

21. The method of claim 20, in which the influencing of the jitter performance comprises establishing at least one of sequences of data for the data signal, a data transfer rate, and stability of a clock recovery process associated with the data recovery.

22. The method of claim 21, in which run length for a sequence of same state data for the data is configured for a duration sufficient to reach a waterfall region of a jitter curve characteristic of the clock recovery process.

23. The method of claim 19, further comprising:
formatting the recovered data for the first data into word format;
the comparing and counting comprising:
comparing words of the reformatted recovered data to words of the reference data; and
counting a number of bit errors therebetween.

24. The method of claim 19, further comprising:
formatting the recovered data for the first data into parallel format;
the comparing and the counting comprising:
comparing words of the reformatted data relative to respective words of the reference data to determine any differences therebetween; and
counting a number of comparisons yielding a difference determination.

25. The method of claim 24, further comprising continuing the counting for duration to encompass multiple word-to-word comparisons for each random number defined.

26. The method of claim 25, further comprising defining the random number as least significant bits of the number counted.

27. The method of claim 26, further comprising:
encrypting a communication signal using a seed based encryption key; and
forming the encryption key with seed values based on the defined random numbers.

28. The method of claim 19, further comprising:
configuring predetermined source data within a first memory to comprise a stress sequence of same-state data;
defining a run-length for the stress sequence of same-state data to extend over a stress duration;
retrieving the predetermined source data from the first memory;
multiplexing words of the predetermined source data retrieved from the first memory to convert the words of the predetermined source data from a parallel formatted data into a serially formatted data;
transmitting the serially formatted data;
receiving the transmitted serially formatted data as the data signal;
retrieving the reference data related to the predetermined source data from a second memory; and
storing the stress sequence as at least a part of the reference data in the second memory.

29. The method of claim 28, further comprising:
storing conditioning data in the first memory as a preamble before the stress sequence;
when receiving the preamble, using transitions of the conditioning data to synchronize a recovered clock; and
after the synchronizing of the recovered clock with the preamble and during an interval of time associated with receipt of the transmitted stress sequence, performing the retrieval of the reference data, the comparing, and the determining and the counting of errors.

30. The method of claim 29, further comprising repeating each of:
the retrieving, the multiplexing and the transmitting to again transmit the preamble and the stress sequence;
the receiving of the transmitted, serially formatted data corresponding to the preamble and the stress sequence;
the retrieving of the reference data, the comparing and the determining and counting of errors; and
the counting to accumulate respective counts of the determined differences.

31. The method of claim 30, further comprising continuing the repeating and count accumulations through the count duration associated with the random number to be defined.

32. The method of claim 31, further comprising:
determining a time lapse for a predefined error probability or jitter characteristic curve associated with clock recovery of magnitude sufficient to reach a waterfall region of the jitter characteristic curve; and
defining run-length of the stress sequence based on the determined time lapse.

33. The method of claim 32, further comprising sampling the accumulated count after a plurality of repeats.

* * * * *